(12) United States Patent
Yun et al.

(10) Patent No.: US 11,015,815 B2
(45) Date of Patent: May 25, 2021

(54) COOKING APPLIANCE

(71) Applicant: LG ELECTRONICS INC., Seoul (KR)

(72) Inventors: Seongjun Yun, Seoul (KR); Namil Lee, Seoul (KR); Seungjun Lee, Seoul (KR); Seungtae Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 90 days.

(21) Appl. No.: 16/385,038

(22) Filed: Apr. 16, 2019

(65) Prior Publication Data

US 2019/0316779 A1     Oct. 17, 2019

(30) Foreign Application Priority Data

Apr. 16, 2018    (KR) ........................ 10-2018-0044017

(51) Int. Cl.
  *F23M 7/00*    (2006.01)
  *F24C 7/08*    (2006.01)
  (Continued)

(52) U.S. Cl.
  CPC ............ *F24C 7/088* (2013.01); *F24C 15/028* (2013.01); *F24C 15/36* (2013.01)

(58) Field of Classification Search
  CPC ........ F24C 15/006; F24C 15/02; F24C 7/085; F24C 15/04; F24C 7/082; F24C 15/023; F24C 15/024; F24C 15/008; F24C 15/026; F24C 15/027; F24C 15/028; F24C 15/162; F24C 3/128; F24C 7/00; F24C 7/08; H05B 6/642; H05B 6/6435; H05B 6/6414;
  (Continued)

(56) References Cited

U.S. PATENT DOCUMENTS

2008/0105248 A1    5/2008  Lee
2008/0134903 A1    6/2008  Kim et al.
  (Continued)

FOREIGN PATENT DOCUMENTS

DE   10 2006 004371         8/2007
EP        3042125 A1         7/2016
  (Continued)

OTHER PUBLICATIONS

EP Search Report in European Application No. EP19168896, dated Aug. 21, 2019, 9 pages.

*Primary Examiner* — Jason Lau
(74) *Attorney, Agent, or Firm* — Fish & Richardson P.C.

(57) ABSTRACT

A cooking appliance includes a body having a cooking chamber, a door rotatably connected to the body, hinge mechanisms that rotatably connect the door to the body, a control device disposed at the door, and a wire connected to the control device. The door includes a front panel that seats the control device, an intermediate panel spaced apart from the front panel and disposed rearward of the front panel toward the cooking chamber, a rear panel spaced apart from the intermediate panel and disposed rearward of the intermediate panel toward the cooking chamber, a pair of side frames disposed at both lateral sides of the intermediate panel and disposed vertically below the control device, and a lower frame configured to support the intermediate panel and the rear panel. At least one of the side frames includes a wire guide configured to guide the wire to the control device.

20 Claims, 6 Drawing Sheets

(51) Int. Cl.
*F24C 15/02* (2006.01)
*F24C 15/36* (2006.01)

(58) Field of Classification Search
CPC ........ H05B 6/80; H05B 6/6411; H05B 6/766;
H05B 47/105; H05B 6/6417; H05B
6/6423; H05B 6/6426; H05B 2203/013;
H05B 3/84; H05B 47/10; H05B 6/062;
H05B 6/129; H05B 6/6429; H05B
6/6447; H05B 6/6473; H05B 6/666;
H05B 6/668; H05B 6/763
See application file for complete search history.

(56) References Cited

U.S. PATENT DOCUMENTS

| | | |
|---|---|---|
| 2009/0188913 A1 | 7/2009 | Kimura et al. |
| 2018/0202665 A1 | 7/2018 | Park et al. |
| 2019/0128533 A1 | 5/2019 | Bunzel et al. |

FOREIGN PATENT DOCUMENTS

| | | | | |
|---|---|---|---|---|
| EP | 3042125 B1 | 9/2017 | | |
| JP | H01189422 | 7/1989 | | |
| JP | 2009180430 | 8/2009 | | |
| KR | 10-0803773 | 2/2008 | | |
| KR | 10-2008-0024025 A | 3/2008 | | |
| KR | 20170004523 | 1/2017 | | |
| WO | WO 2008/032903 | 3/2008 | | |
| WO | WO-2015032675 A1 * | 3/2015 | .............. | F24C 15/04 |
| WO | WO 2017/178366 | 10/2017 | | |

\* cited by examiner

COOKING APPLIANCE

CROSS-REFERENCE TO RELATED APPLICATION

This application is based on and claims the benefit of priority to Korean Patent Application No. 10-2018-0044017, filed on Apr. 16, 2018, in the Korean Intellectual Property Office, the disclosure of which is incorporated herein in its entirety by reference.

TECHNICAL FIELD

The present disclosure relates to a cooking appliance.

BACKGROUND

A cooking appliance is an appliance that can cook food using heat from a heat source.

In some cases, the cooking appliance may include a body having a cooking chamber, at least one heat source disposed at the body, and a door connected to the body and configured to open and close the cooking chamber.

The cooking appliance may further include a control device that inputs a command for controlling the cooking appliance and that displays information to a user. The control device may include an operation unit that receives an operation of a user and a display unit that displays information.

In some examples, the control device may be disposed in the body or the door.

In some cases, in which the control device is disposed in the door, the cooking appliance may include a wire connected to the control device and inserted into the body.

In some examples, a cooking appliance may include a control PCB located in a door.

The cooking appliance may further include a first connector located in a body, and a second connector that is located in the door and that is configured to connect to the first connector when the door is closed.

In some cases, since the second connector is connected to or disconnected from the first connector, at least one of the first connector or the second connector may be damaged by friction occurring when the first connector is connected to the second connector.

In some cases, the second connector may be damaged in a state in which the door is opened because the second connector protrudes from the door.

SUMMARY

The present disclosure describes a cooking appliance including a wire that is connected to a control device located at a door and that is stably inserted into a body.

The present disclosure further describes a cooking apparatus including a wire that avoids interference with a hinge mechanism during opening and closing of a door, where the wire is prevented from being damaged during the opening and closing of the door.

According to one aspect of the subject matter described in this application, a cooking appliance includes a body that defines a cooking chamber therein, a door rotatably connected to the body and configured to open and close at least a portion of the cooking chamber, a plurality of hinge mechanisms that rotatably connect the door to the body, a control device disposed at the door, and a wire connected to the control device. The door includes a front panel having a rear surface that seats the control device, at least one intermediate panel that is spaced apart from the front panel and that is disposed rearward of the front panel toward the cooking chamber based on the door being closed, a rear panel that is spaced apart from the at least one intermediate panel and that is disposed rearward of the at least one intermediate panel toward the cooking chamber based on the door being closed, a pair of side frames that are disposed at both lateral sides of the at least one intermediate panel and that are disposed vertically below the control device based on the door being closed, and a lower frame configured to support the at least one intermediate panel and the rear panel. At least one of the pair of side frames includes a wire guide configured to guide the wire to the control device.

Implementations according to this aspect may include one or more of the following features. For example, the control device may include at least one of a display device configured to display information to a user or an operation device configured to receive input from the user. In some implementations, the wire guide may include: a first extension that contacts the rear surface of the front panel and that extends in a first direction from a first surface of the at least one of the pair of side frames; a second extension that is bent from the first extension and that extends in a direction perpendicular to the rear surface of the front panel; and a third extension that is bent from the second extension and that extends toward the first surface of the at least one of the pair of side frames in a direction opposite to the first direction. The wire guide may define an accommodation space that is surrounded by the first, second, and third extensions and that is configured to accommodate the wire therein.

In some examples, the third extension may extend in parallel to the first extension, and have an end that is spaced apart from the first surface of the at least one of the pair of side frames and that defines a path configured to allow insertion of the wire to the accommodation space. In some examples, the at least one intermediate panel may cover at least a portion of the path. In some examples, the at least one intermediate panel may include a first intermediate panel that faces a side surface of the second extension, and a second intermediate panel that is spaced apart from the first intermediate panel and that covers at least the portion of the path.

In some implementations, the cooking appliance may further include a guide frame configured to receive the wire guided by the wire guide and to direct the wire toward the body through a hinge space defined between the hinge mechanisms. In some examples, the body may define a body opening configured to receive the guide frame, and the lower frame may be rotatably connected to the guide frame. In some examples, the lower frame may include a panel support configured to support the at least one intermediate panel and the rear panel, and side frame connection portions disposed at both lateral sides of the panel support, respectively. The panel support may define a slot configured to receive the wire.

In some examples, the panel support may include a guide frame connection portion to which the guide frame is rotatably connected. In some examples, the guide frame may include: a frame body that defines a guide space configured to receive the wire, and a connection body that is configured to rotatably connect the frame body to the guide frame connection portion. The connection body may define a guide opening configured to receive the wire to thereby allow the wire to extend to the guide space of the frame body.

In some implementations, the connection body may include a first hinge portion having a first diameter, and a second hinge portion having a second diameter that is less than the first diameter of the first hinge portion. The guide frame connection portion may define a first hinge hole configured to receive the first hinge portion, and a second hinge hole configured to receive the second hinge portion. In some examples, each of the plurality of hinge mechanisms may include a hinge body that is connected to one of the pair of side frames and that passes through the corresponding side frame connection portion.

In some implementations, the wire may include a first wire and a second wire, and the pair of side frames may include a first side frame configured to guide the first wire to the control device, and a second side frame configured to guide the second wire to the control device. In some implementations, the at least one of the pair of side frames may define a first chamber and a second chamber that extend along the wire guide, and the first chamber may be defined at a position between the wire guide and the second chamber.

In some examples, the second chamber may be disposed laterally outward of the first chamber to an outside of the door. In some examples, each of the hinge mechanisms may include a hinge frame disposed at the body, and a hinge body that is rotatably connected to the hinge frame and that is connected to the first chamber. In some examples, the cooking appliance may further include a side decoration member disposed at a side of each of the pair of side frames, and the second chamber may face the side decoration member.

In some implementations, the control device may be disposed at an upper portion of the door. The wire may include at least one of (i) a power line configured to supply power from a power source to one or more components of the cooking appliance or (ii) a signal line configured to transmit control signals from the control device to the one or more components of the cooking appliance. The wire guide may be configured to guide the wire from the control device downward to the body. In some examples, each of the plurality of hinge mechanisms may be disposed at a lower portion of the body, and the wire guide may be configured to guide the wire from the control device downward to the lower portion of the body through one of the plurality of hinge mechanisms.

DETAILED DESCRIPTION

Hereinafter, one or more implementations of the present disclosure will be described in detail with reference to the accompanying drawings. It should be noted that when components in the drawings are designated by reference numerals, the same components have the same reference numerals as far as possible even though the components are illustrated in different drawings.

Figure 1:
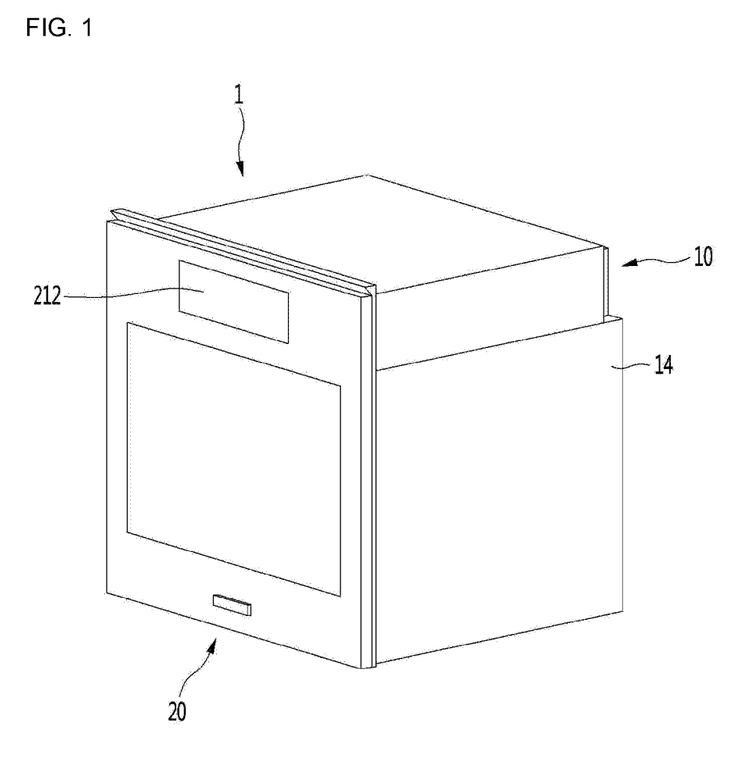
FIG. 1 is a perspective view showing an example cooking appliance.
Figure 2:
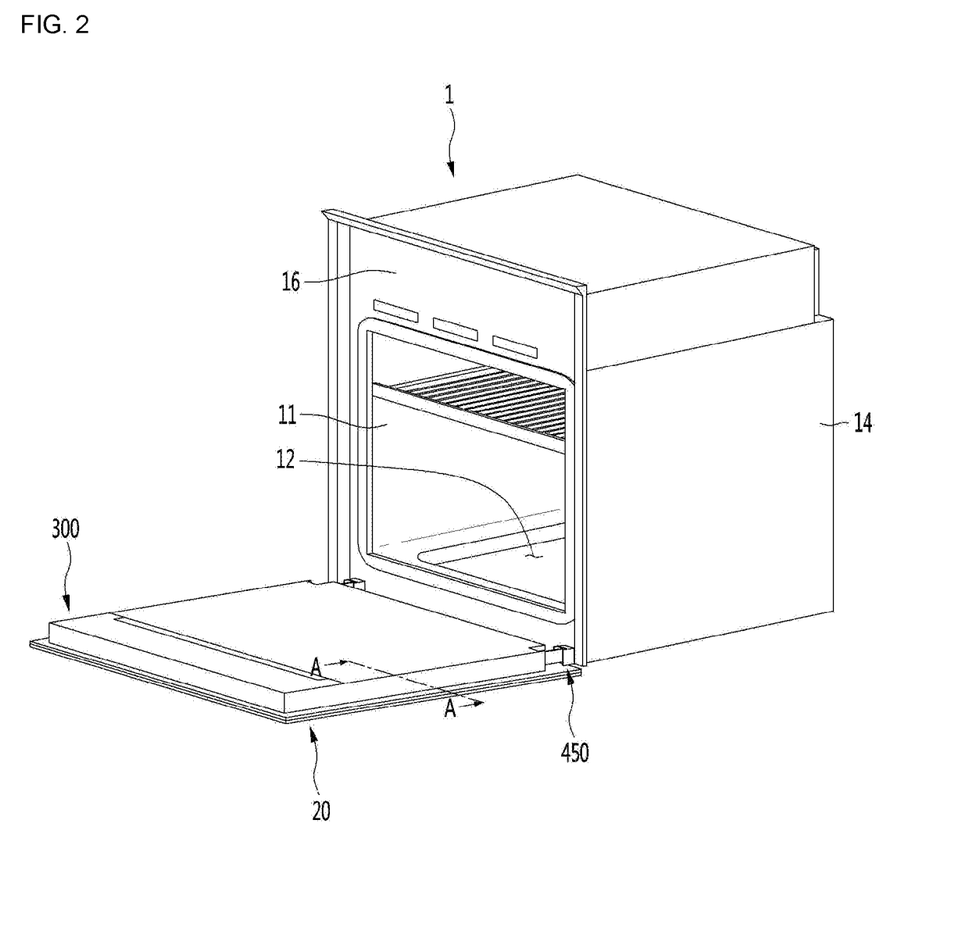
FIG. 2 is a perspective view showing an example door that is opened in the cooking appliance of FIG. 1.
Figure 3:
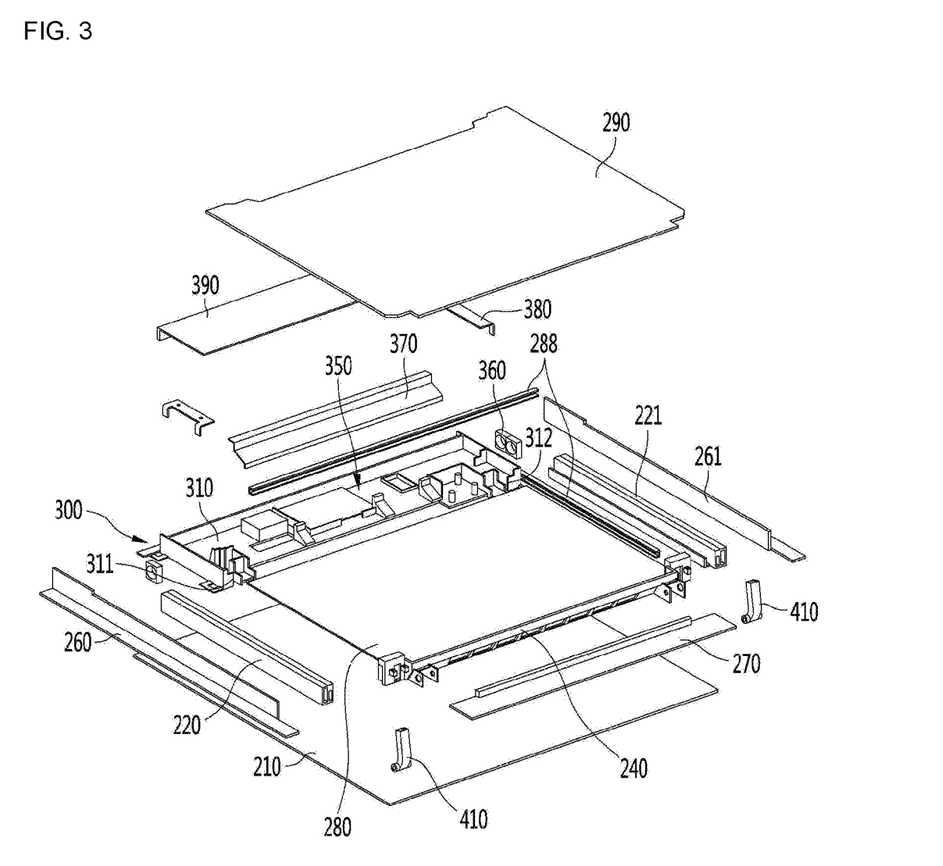
FIG. 3 is an exploded perspective view showing an example door.

FIG. 1 is a perspective view showing an example cooling appliance, FIG. 2 is a perspective view showing an example door that is opened in the cooking appliance of FIG. 1, and FIG. 3 is an exploded perspective view showing an example door.

Referring to FIGS. 1 to 3, a cooking appliance 1 may include a body 10 that accommodates various parts therein.

The body 10 may include an inner frame 11 and an outer frame 14 that surrounds the inner frame 11 and that is disposed at an outer side of the inner frame 11.

A body panel 16 may be disposed at a front end of the inner frame 11. The body panel 16 may be connected to or may be formed integrally with the front end of the inner frame 11.

The door 20 may be rotatably connected to the body 10 by a hinge mechanism 450. In some examples, the hinge mechanism 450 may be connected to a lower end of the door 20.

The door 20 may further include a control device 300.

The control device 300 may be, but limited to, disposed on an upper portion of the door 20 and may be configured to, based on the door 20 being closed, face a portion of the body positioned on the upper side of the cooking chamber 12 of the body panel 16.

The control device 300 may include at least one of a display unit or an operation unit. For example, the control device 300 may display operation information of the cooking appliance 1 and/or receive an operation command of the user through the control device 300.

The door 20 may include a front panel 210. The control device 300 may be installed on the rear surface of the front panel 210.

The front panel 210 may form a front appearance of the door 20. Although not limited thereto, the front panel 210 may be formed of a glass material, and may form an entire front appearance of the door 20.

The control device 300 may include a control housing 310 installed on a rear surface of the front panel 210 and a display PCB 350 installed in the control housing 310. The control device 300 may further include a cooling fan 360 configured to cool the display PCB 350.

A display window 212 may be defined at a position corresponding to the display PCB 350 in the front panel 210. For example, the display panel may be disposed between the display window 212 and the display PCB 350. The display panel may include an LCD panel that displays only information, or a touch panel that not only displays information but also receives a touch command.

The control device 300 may further include a control cover 390 which covers the control housing 310.

The display PCB 350 may be protected from heat and cooled by the cooling fan 360 by the control housing 310 and the control cover 390.

The door 20 may further include a pair of side frames 220 and 221 installed on the rear surface of the front panel 210 and a lower frame 240 configured to connect the lower sides of the pair of side frames 220 and 221.

A connection bracket 380 may be connected to the control cover 390 and the connection bracket 380 may be connected to the side frames 220 and 221.

The door 20 may further include at least one intermediate panel 280 that is disposed rearward of the front panel 210 toward the cooking chamber 12 and that is spaced apart from the front panel 210, and a rear panel 290 that is disposed rearward the intermediate panel 280 toward the cooking chamber 12.

In some examples, the at least one intermediate panel 280 may serve as an insulating panel configured to prevent or reduce heat transfer of the cooking chamber 12 to an outside of the cooking chamber. The rear panel 290 may cover the cooking chamber 12 when the door 20 is closed.

The intermediate panel 280 and the rear panel 290 may also be formed of a glass material. Therefore, the user may check the cooking state of food accommodated in the cooking chamber 12 in a state where the door 20 is closed.

The lower frame 240 may support the intermediate panel 280 and the rear panel 290. In this case, the lower frame 240 may support the intermediate panel 280 such that the intermediate panel 280 is spaced apart from the front panel 210. In addition, the lower frame 240 may support the rear panel 290 such that the rear panel 290 is spaced apart from the intermediate panel 280.

In some examples, where the door 20 includes a plurality of intermediate panels, the lower frame 240 may support the plurality of intermediate panels in a state where the plurality of intermediate panels are spaced apart from one another.

Therefore, a cooling flow path may be formed between the front panel 210 and the intermediate panel 280 and between the intermediate panel 280 and the rear panel 290. Air outside the door 20 may be introduced into the flow path.

A buffer member 288 may be disposed between the intermediate panel 280 and the rear panel 290 to absorb a shock while maintaining a predetermined gap between the intermediate panel 280 and the rear panel 290.

The door 20 may further include a pair of side decoration members 260 and 261 disposed outside the pair of side frames 220 and 221 and a lower decoration members 270 disposed under the lower frame 240.

For example, the display PCB 350, a motor for driving the cooling fan 360, and the like may be connected to wires, which may be inserted into the body 10. The wires may include a power line as well as a signal line.

The wires may be guided by the side frames 220 and 221 and extend downward, for example.

The door 20 may further include a guide frame 410 configured to direct a wire, guided along the side frames 220 and 221, into the body 10.

A structure for inserting a wire connected to the control device 300 into the body 10 will be described in detail below.

Figure 4:
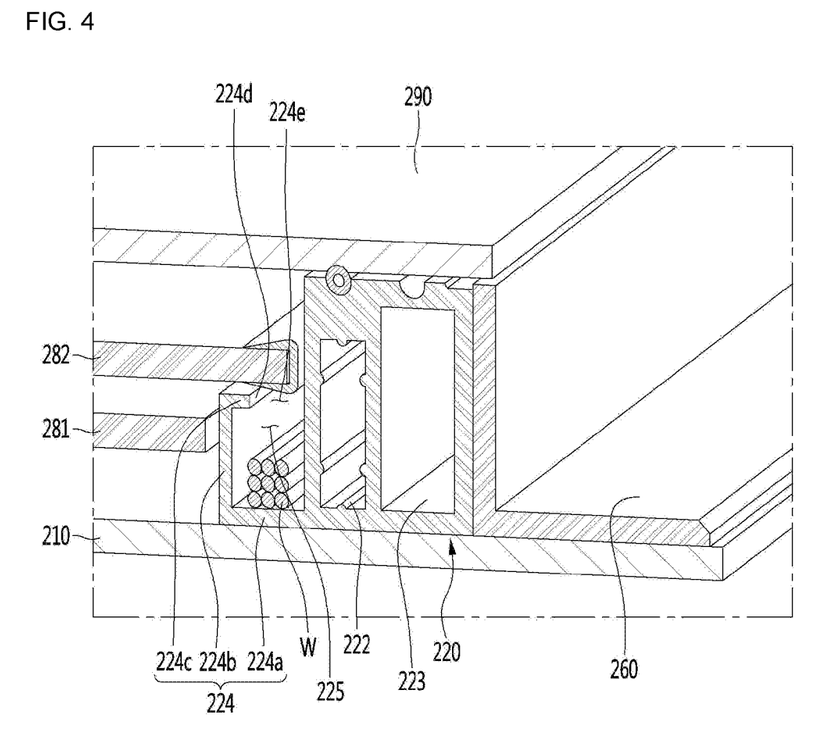
FIG. 4 is a cross-sectional view taken along line A-A of FIG. 2.
Figure 5:
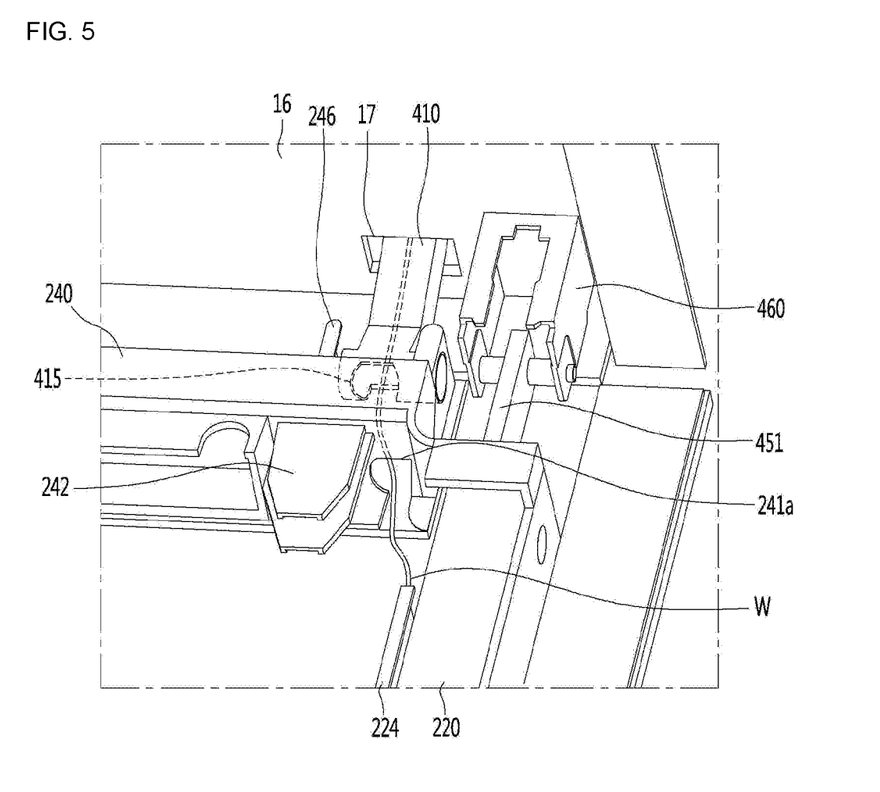
FIG. 5 is a view showing an example wire that extend along an example side frame and that is inserted into an example body through an example guide frame in a state in which an example door is opened.
Figure 6:
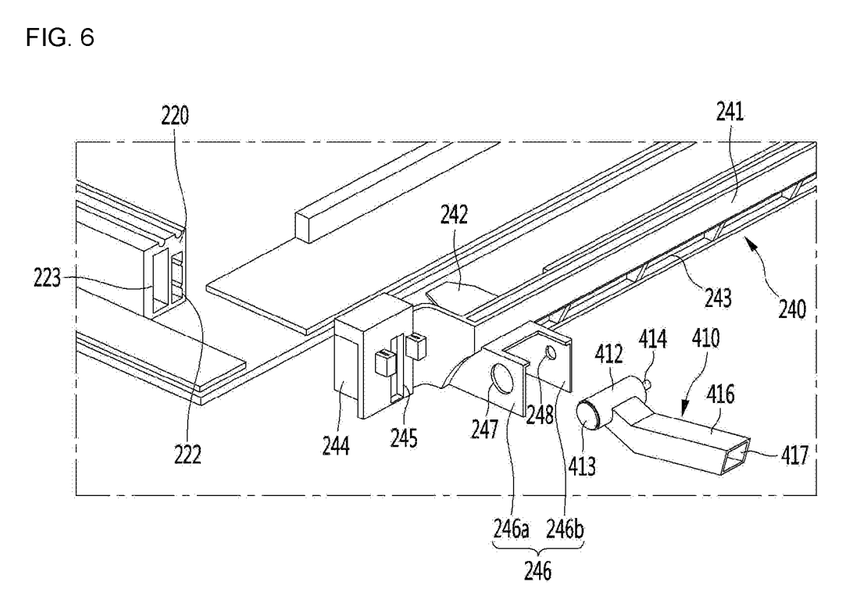
FIG. 6 is a perspective view showing an example side frame, an example lower frame, and an example guide frame.

FIG. 4 is a cross-sectional view taken along line A-A of FIG. 2. FIG. 5 is a view showing an example wire that extends along an example side frame and that is inserted into an example body through an example guide frame in a state in which an example door is opened. FIG. 6 is a perspective view showing an example side frame, an example lower frame, and an example guide frame.

Referring to FIGS. 4 to 6, in order to stably guide wires W connected to the control device 300 to the body 10, some of the wires W may be guided along the first side frame 220 of the pair of side frames 220 and 221. Others of the wires W may be guided along the second side frame 221 of the pair of side frames 220 and 221.

In some implementations, the door 20 may include a pair of guide frames 410. Since the pair of side frames 220 and 221 have the same structure and the pair of guide frames 410 have the same structure, the structure of the first side frame 220 will be described below to avoid redundancy.

In some implementations, the wires W connected to the control device 300 may be guided by only one of the pair of side frames 220 and 221, depending on the number of the wires W. In some examples, the wires W may include a first wire and a second wire. The pair of side frames may include a first side frame 220 configured to guide the first wire to the control device, and a second side frame 221 configured to guide the second wire to the control device.

That is, as the number of electronic components included in the control device 300 increases, the number of the wires W connected to the control device 300 may also increase. Therefore, the wires W may be guided by one side frame, or the wires W may be divided into two groups which are guided by two side frames, depending on the number of the wires W.

The first side frame 220 may extend vertically from the rear surface of the front panel 210 in a state in which the door 20 is closed. In this case, the first side frame 220 may be disposed under the control housing 310.

The first side frame 220 may include a first chamber 222 that extends in the vertical direction. A hinge body 451 of the hinge mechanism 450 may be inserted into the first chamber 222.

The hinge body 451 may be rotatably connected to a hinge frame 460 disposed at the body 10. The hinge body 451 may be inserted into the first chamber 222 from the lower side of the first chamber 222. The door 20 may be rotated together with the hinge body 451 in a state where the hinge body 451 is inserted into the first chamber 222.

In some examples, the lower end of the first side frame 220 may be arranged at a position aligned with the hinge frame 460, as shown in FIG. 5.

The first side frame 220 may come into contact with the rear panel 290. The size of the rear panel 290 may be larger than the size of the intermediate panel 280.

Thus, the intermediate panel 280 may be disposed between the pair of side frames 220 and 221. FIG. 4 shows that a first intermediate panel 281 and a second intermediate panel 282 are present in the pair of side frames 220 and 221, for example.

Accordingly, the front panel 210, the first intermediate panel 281, the second intermediate panel 282, and the rear panel 290 may be sequentially arranged.

The side decoration member 260 may be disposed at an outside of the first side frame 220, and the second chamber 223 may be disposed at a position between the first chamber 222 and the side decoration member 260 in the first side frame 220. The second chamber 223 may also vertically extend from the first side frame 220.

The second chamber 223 may serve as an air chamber and may minimize heat transfer to the side decoration member 260.

The control housing 310 may define slots 311 and 312 through which the wires W are withdrawn toward the outside.

The wires W may be withdrawn toward outside the control housing 310 through the slots 311 and 312.

In some implementations, since the hinge body 451 is accommodated in the first chamber 222, when the wire W extending from the control device 300 is rotated by the door 20, in order not to interfere with the hinge body 451, the wire W needs to extend in a region inside the pair of hinge bodies 451.

In some implementations, a wire guide 224 configured to direct the wire W may be disposed on the opposite side to the side decoration member 260 with respect to the first chamber 222 in the first side frame 220.

That is, the wire guide 224 may be disposed between the first chambers 222 of the pair of side frames 220 and 221.

The wire guide 224 may guide one or more electric wires including power lines configured to transmit power from a power source to the control device 300, and signal lines configured to transmit control signals from the control device 300 to other components of the cooking appliance 1.

The wire guide 224 may include a first extension 224a configured to come into contact with the rear surface of the front panel 210, a second extension 224b that is bent from the first extension 224a and that extends in a direction perpendicular to the front panel 210, and a third extension 224c that extends toward the first chamber 222 from an end of the second extension 224b.

The first extension 224a may extend in one direction (e.g., one lateral direction) from one surface of the first side frame 220 and the third extension 224c may extend from the second extension 224b toward the one surface of the first side frame 220 in a direction opposite to the extending direction of the first extension 224a. In this case, the one surface of the first side frame 220 may be a surface perpendicular to the rear surface of the front panel 210.

The third extension 224c may extend in parallel to the first extension 224a and the horizontal (e.g., left-right) length thereof may be shorter than that of the first extension 224a.

The end 224d of the third extension 224c may be spaced apart from the one surface of the first side frame 220 to form a path 224e into which the wire W is inserted.

The wire guide 224 may define an accommodation space 225 in which the wire W is disposed.

In some implementations, the first intermediate panel 281 may be located on the side of the second extension 224b and the second intermediate panel 282 may cover the path 224e. When there is one intermediate panel, the intermediate panel may be arranged to cover the path 224e.

As an example, the first intermediate panel 281 may be disposed between the second extensions 224b of the pair of side frames 220 and 221.

In some implementations, the wire W positioned in the accommodation space 225 may be restricted from slipping out of the accommodation space 225 by the third extension 224c and may be also restricted from slipping out of the accommodation space 225 by the intermediate panel 282.

The lower frame 240 may include a panel support 241 configured to support the first and second intermediate panels 281 and 282 and the rear panel 290, and a side frame connection portion 244 disposed at both ends of the panel support 241.

The panel support 241 may include a plurality of support ribs 242 to support the first and second intermediate panels 281 and 282 and the rear panel 290 in a state of being spaced apart from each other.

A portion of the side frame connection portion 244 may be fitted in the second chamber 223 and therefore, the side frame connection portion 244 may support the side frames 220 and 221.

In this state, a single fastening member may fasten the side decoration member 260, the side frames 220 and 221, and the side frame connection portion 244.

An opening 245 through which the hinge body 451 passes may be formed in the side frame connection portion 244.

A guide frame connection portion 246 to which the guide frame 410 is connected may be disposed under the panel support 241. For example, the guide frame connection portion may be disposed directly below the panel support 241. The guide frame 410 may be rotatably connected to the guide frame connection portion 246.

The guide frame connection portion 246 may be disposed at a position spaced inward from the side frame connection portion 244 such that the guide frame 410 does not interfere with the hinge body 451.

That is, the pair of guide frames 410 may be disposed between the pair of hinge bodies 451.

The guide frame connection portion 246 may include a pair of plates 246a and 246b spaced apart from each other.

The guide frame 410 may include a frame body 416 configured to define a guide space 417 for guiding wires therein and a connection body configured to rotatably connect the frame body 416 to the guide frame connection portion 246.

The frame body 416 may have, for example, a rectangular parallelepiped shape, but is not limited thereto.

The connection body 412 may be formed to have, for example, a cylindrical shape having a space therein and the frame body 416 may extend in a direction intersecting the rotation center of the connection body 412 in the connection body 412.

The connection body 412 may include a pair of hinge portions 413 and 414.

The pair of hinge portions 413 and 414 may include a first hinge portion 413 and a second hinge portion 414 having a smaller diameter than that of the first hinge portion 413.

In this regard, the guide frame connection portion 246 may include a first hinge hole 247 configured to receive the first hinge portion 413, and a second hinge hole 248 configured to receive the second hinge portion 414. The first hinge portion 413 may be rotatably connected to the first hinge hole 247, and the second hinge portion 414 may be rotatably connected to the second hinge hole 248.

In some examples, the pair of plates 246a and 246b may include a first plate 246a in which the first hinge holes 247 is formed and a second plate 246b spaced apart from the first plate 246a, in which the second hinge holes 248 is formed.

By varying the diameters of the hinge portions 413 and 414, the guide frame 410 may be easily assembled to the guide frame connection portion 246 and, in the assembled state, the guide frame 410 may be rotated.

For example, after the first hinge portion 413 is positioned in the first hinge hole 247, the second hinge portion 414 may be connected to the second hinge hole 248.

A guide opening 415 may be formed in the connection body 412 such that the wire W passes through the connection body 412. The panel support 241 may have a slot 241a through which the wire W passes.

The electric wire W guided by the side frames 220 and 221 may passes through the slot 241a of the panel support 241 and be then inserted into the guide frame 410 through the guide opening 415 of the connection body 412.

A portion of the guide frame 410 may be inserted into the inside of the body 10 through a body opening 17 defined in the body panel 16 of the body 10.

In some implementations, since the wire W connected to the control device 300 is positioned inside the pair of hinge mechanisms 450, it may be possible to prevent the wire W from interfering with the hinge when the door 20 is opened or closed and from being exposed to the outside.

In addition, since the wire W extends along the inside of the guide frame relatively rotating with the door 20, it may be possible to prevent the wire W from being damaged when the door 20 is opened or closed.

In some implementations, the wire guide may be defined in the side frame, and the wire connected to the control device may stably extend to the lower side of the door even when the control device is positioned on the upper side of the door.

In addition, since the wire connected to the control device are located in an area inside the pair of hinge mechanisms, it may be possible to prevent or reduce an exposure to an outside of the door and interference between the wire W and the hinge when the door 20 is opened or closed.

Furthermore, the wire may extend along the inside of the guide frame and rotate with the door, which may prevent or reduce damage to the wire W when the door 20 is opened or closed.

What is claimed is:

1. A cooking appliance comprising:
   a body that defines a cooking chamber therein;
   a door rotatably connected to the body and configured to open and close at least a portion of the cooking chamber;
   a plurality of hinge mechanisms that rotatably connect the door to the body;
   a control device disposed at the door; and
   a wire connected to the control device, wherein the door comprises:
      a front panel having a rear surface that seats the control device,
      a rear panel that is spaced apart from the front panel and that is disposed rearward of the front panel toward the cooking chamber based on the door being closed,
      at least one intermediate panel that is spaced apart from the front panel, that extends parallel to the front panel, and that is disposed between the front panel and the rear panel,
      a pair of side frames that are disposed at both lateral sides of the at least one intermediate panel and that are disposed vertically below the control device based on the door being closed, at least one of the pair of side frames comprising a wire guide configured to guide the wire to the control device, wherein the wire guide defines a path that is open toward the rear panel and covered by the at least one intermediate panel, and
      a lower frame configured to support the at least one intermediate panel and the rear panel.

2. The cooking appliance of claim 1, wherein the control device comprises at least one of a display device configured to display information to a user or an operation device configured to receive input from the user.

3. The cooking appliance of claim 1, wherein the wire guide comprises:
   a first extension that contacts the rear surface of the front panel and that extends in a first direction from a first surface of the at least one of the pair of side frames;
   a second extension that is bent from the first extension and that extends in a direction perpendicular to the rear surface of the front panel; and
   a third extension that is bent from the second extension and that extends toward the first surface of the at least one of the pair of side frames in a direction opposite to the first direction, and
   wherein the wire guide defines an accommodation space that is surrounded by the first, second, and third extensions and that is configured to accommodate the wire therein.

4. The cooking appliance of claim 3, wherein the third extension extends in parallel to the first extension, and has an end that is spaced apart from the first surface of the at least one of the pair of side frames to thereby define the path, the path being configured to allow insertion of the wire to the accommodation space.

5. The cooking appliance of claim 3, wherein the at least one intermediate panel comprises:
   a first intermediate panel that faces a side surface of the second extension; and
   a second intermediate panel that is spaced apart from the first intermediate panel and that covers at least the portion of the path.

6. The cooking appliance of claim 1, further comprising a guide frame configured to receive the wire guided by the wire guide and to direct the wire toward the body through a hinge space defined between the plurality of hinge mechanisms.

7. The cooking appliance of claim 6, wherein the body defines a body opening configured to receive the guide frame, and
   wherein the lower frame is rotatably connected to the guide frame.

8. The cooking appliance of claim 7, wherein the lower frame comprises:
   a panel support configured to support the at least one intermediate panel and the rear panel; and
   side frame connection portions disposed at both lateral sides of the panel support, respectively, and
   wherein the panel support defines a slot configured to receive the wire.

9. The cooking appliance of claim 8, wherein the panel support comprises a guide frame connection portion to which the guide frame is rotatably connected.

10. The cooking appliance of claim 9, wherein the guide frame comprises:
    a frame body that defines a guide space configured to receive the wire; and
    a connection body that is configured to rotatably connect the frame body to the guide frame connection portion, the connection body defining a guide opening configured to receive the wire to thereby allow the wire to extend to the guide space of the frame body.

11. The cooking appliance of claim 10, wherein the connection body comprises a first hinge portion having a first diameter, and a second hinge portion having a second diameter that is less than the first diameter of the first hinge portion, and
    wherein the guide frame connection portion defines a first hinge hole configured to receive the first hinge portion, and a second hinge hole configured to receive the second hinge portion.

12. The cooking appliance of claim 8, wherein each of the plurality of hinge mechanisms comprises a hinge body that is connected to one of the pair of side frames and that passes through the corresponding side frame connection portion.

13. The cooking appliance of claim 1,
    wherein the pair of side frames comprise a first side frame and a second side frame, and
    wherein at least one of the first side frame or the second side frame is configured to guide the wire to the control device.

14. The cooking appliance of claim 1, wherein the at least one of the pair of side frames defines a first chamber and a second chamber that extend along the wire guide, and
    wherein the first chamber is defined at a position between the wire guide and the second chamber.

15. The cooking appliance of claim 14, wherein the second chamber is disposed laterally outward of the first chamber to an outside of the door.

16. The cooking appliance of claim 14, wherein each of the hinge mechanisms comprises:
 a hinge frame disposed at the body; and
 a hinge body that is rotatably connected to the hinge frame and that is connected to the first chamber.

17. The cooking appliance of claim 14, further comprising a side decoration member disposed at a side of each of the pair of side frames,
 wherein the second chamber faces the side decoration member.

18. The cooking appliance of claim 1, wherein the control device is disposed at an upper portion of the door,
 wherein the wire comprises at least one of (i) a power line configured to supply power from a power source to one or more components of the cooking appliance or (ii) a signal line configured to transmit control signals from the control device to the one or more components of the cooking appliance, and
 wherein the wire guide is configured to guide the wire from the control device downward to the body.

19. The cooking appliance of claim 18, wherein each of the plurality of hinge mechanisms is disposed at a lower portion of the body, and
 wherein the wire guide is configured to guide the wire from the control device downward to the lower portion of the body through one of the plurality of hinge mechanisms.

20. The cooking appliance of claim 1, wherein the least one intermediate panel extends from one of the pair of side frames to the other of the pair of side frames.

* * * * *